(12) United States Patent
Tazawa et al.

(10) Patent No.: US 9,420,360 B2
(45) Date of Patent: Aug. 16, 2016

(54) TRANSPORT APPARATUS AND METHOD OF TRANSMITTING MONITORING CONTROL SIGNAL

(71) Applicant: FUJITSU LIMITED, Kawasaki-shi, Kanagawa (JP)

(72) Inventors: Hideaki Tazawa, Yokohama (JP); Hiroshi Nishida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/467,502

(22) Filed: Aug. 25, 2014

(65) Prior Publication Data

US 2015/0086196 A1  Mar. 26, 2015

(30) Foreign Application Priority Data

Sep. 25, 2013  (JP) ................................. 2013-198655

(51) Int. Cl.
| H04B 10/08 | (2006.01) |
| --- | --- |
| H04Q 11/00 | (2006.01) |
| H04B 10/077 | (2013.01) |
| H04L 12/26 | (2006.01) |

(52) U.S. Cl.
CPC ....... *H04Q 11/0067* (2013.01); *H04B 10/0773* (2013.01); *H04L 43/10* (2013.01); *H04B 2210/072* (2013.01); *H04Q 2011/0083* (2013.01)

(58) Field of Classification Search
CPC .................. H04Q 11/0067; H04Q 2011/0083; H04Q 2011/0039; H04Q 2011/0079; H04B 10/0773; H04B 10/077; H04B 2210/072; H04B 10/0771; H04L 43/10; H04J 14/0283; H04J 14/0227

USPC ....................... 398/30–33, 59, 60, 4
See application file for complete search history.

(56) References Cited

U.S. PATENT DOCUMENTS

| 4,972,258 A * | 11/1990 | Wolf .................. G02B 21/0096 250/458.1 |
| --- | --- | --- |
| 5,721,821 A * | 2/1998 | Kawano .................. H04L 12/42 709/251 |
| 7,653,298 B2 * | 1/2010 | Ono ....................... G03B 13/32 396/121 |
| 8,095,722 B1 * | 1/2012 | Liao ..................... G06F 13/4022 370/357 |
| 8,103,942 B2 * | 1/2012 | Kuroishi ............... H03M 5/145 714/758 |
| 2006/0098674 A1 * | 5/2006 | Hamasaki ............. H04J 3/1617 370/412 |
| 2006/0129705 A1 * | 6/2006 | Hayasaka ............... G06F 13/24 710/15 |

(Continued)

FOREIGN PATENT DOCUMENTS

| JP | 07-093236 | 4/1995 | |
| --- | --- | --- | --- |
| JP | 08-044660 | * 2/1996 | .............. G06F 13/36 |

*Primary Examiner* — Hibret Woldekidan
(74) *Attorney, Agent, or Firm* — Staas & Halsey LLP

(57) ABSTRACT

A transport apparatus configured to transport a main signal received via one of a plurality of ports to any of the plurality of ports, the transport apparatus includes: a plurality of main signal processing circuits configured to extract a monitoring control signal from the main signal, the plurality of main signal processing circuits being provided to correspond to the plurality of ports, respectively; a monitoring controller configured to receive the monitoring control signal from the plurality of main signal processing circuits; and a serial interface configured to connect the plurality of main signal processing circuits with the monitoring controller on a ring-shaped bus to transfer a serial frame, wherein the serial frame has a mapping field to which the monitoring control signal is mapped.

9 Claims, 14 Drawing Sheets

(56) References Cited

U.S. PATENT DOCUMENTS

| | | | | |
|---|---|---|---|---|
| 2008/0199012 A1* | 8/2008 | Niinomi | ............ | G06F 21/78 380/277 |
| 2008/0294966 A1* | 11/2008 | Kuroishi | ............ | H03M 5/145 714/776 |
| 2011/0295709 A1* | 12/2011 | Kubo | ............ | A63F 13/12 705/26.1 |
| 2014/0164181 A1* | 6/2014 | Kubo | ............ | A63F 13/12 705/26.41 |
| 2014/0194189 A1* | 7/2014 | Kubo | ............ | A63F 13/12 463/25 |

\* cited by examiner

US 9,420,360 B2

TRANSPORT APPARATUS AND METHOD OF TRANSMITTING MONITORING CONTROL SIGNAL

CROSS-REFERENCE TO RELATED APPLICATION

This application is based upon and claims the benefit of priority from the prior Japanese Patent Application No. 2013-198655 filed on Sep. 25, 2013, the entire contents of which are incorporated herein by reference.

FIELD

The embodiments of the present disclosure discussed herein are related to a transport apparatus and a method of transmitting a monitoring control signal.

BACKGROUND

In recent years, as a long-distance transmission network, introduction of the OTN (Optical Transport Network) has been progressed. In a signal transmission frame defined in the OTN (hereinafter referred to as an "OTN frame"), a variety of client signals can be mapped to the same frame. Examples of the client signals may include signals of SONET (Synchronous Optical Network), SDH (Synchronous Digital Hierarchy), Ether Network (Ethernet®), and fiber channels.

Accordingly, as illustrated in FIG. 13, a recent transport (or transmission) apparatus 300 is placed between SONET/SDH network 400, Ethernet 500 and OTN 600. In the transport apparatus 300, it is expected that different types of client signals are accommodated in an OTN frame. In FIG. 13, reference numeral 401 denotes a SONET/SDH termination unit used for the SONET/SDH network 400. Reference numeral 501 denotes an Ethernet termination unit used for the Ethernet 500. FIG. 13 also illustrates a SONET network 400 and a SONET termination unit.

Provisioning of multi-port and multi-protocol is being progressed rapidly in the transport apparatus 300. Accordingly, important signal chips are mounted on a circuit board used for the transporting apparatus 300, thereby increasing the amount of information for monitoring and control these chips. The multi-port is a provision to connect one transport apparatus to many other apparatuses.

As illustrated in FIG. 13, there is also a need to exchange an Ethernet monitoring control signal (frame) (hereinafter also referred to as a "monitoring control frame") between the transport apparatus 300 and the Ethernet termination unit 501. Examples of the monitoring control frame may include an OAM (Operation Administration and Maintenance) frame, a SSM (Source-Specific Multicast) frame, and a Management VLAN (Virtual Local Area Network) frame. These monitoring frames are inserted in a predetermined position of a main signal frame. Therefore, the board of the transport apparatus 300 requires processing of monitoring control signals between apparatuses as well as monitoring control of the board and the amount of monitoring control information to be processed tends to significantly increase with the multi-port provisioning of the board.

Japanese Laid-open Patent Publication No. 07-93236 discloses a technique for connecting system console interface controllers (SCIs) in the form of a ring, requesting bus use in two ways, and performing an access process in a transmission direction in which the bus use is allowed. Japanese Laid-open Patent Publication No. 08-44660 discloses a serial bus system in which a sensor unit and a driver unit connected in series are connected to a controller in the form of a loop.

SUMMARY

According to an aspect of the invention, a transport apparatus configured to transport a main signal received via one of a plurality of ports to any of the plurality of ports, the transport apparatus includes: a plurality of main signal processing circuits configured to extract a monitoring control signal from the main signal, the plurality of main signal processing circuits being provided to correspond to the plurality of ports, respectively; a monitoring controller configured to receive the monitoring control signal from the plurality of main signal processing circuits; and a serial interface configured to connect the plurality of main signal processing circuits with the monitoring controller on a ring-shaped bus to transfer a serial frame, wherein the serial frame has a mapping field to which the monitoring control signal is mapped.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 14:
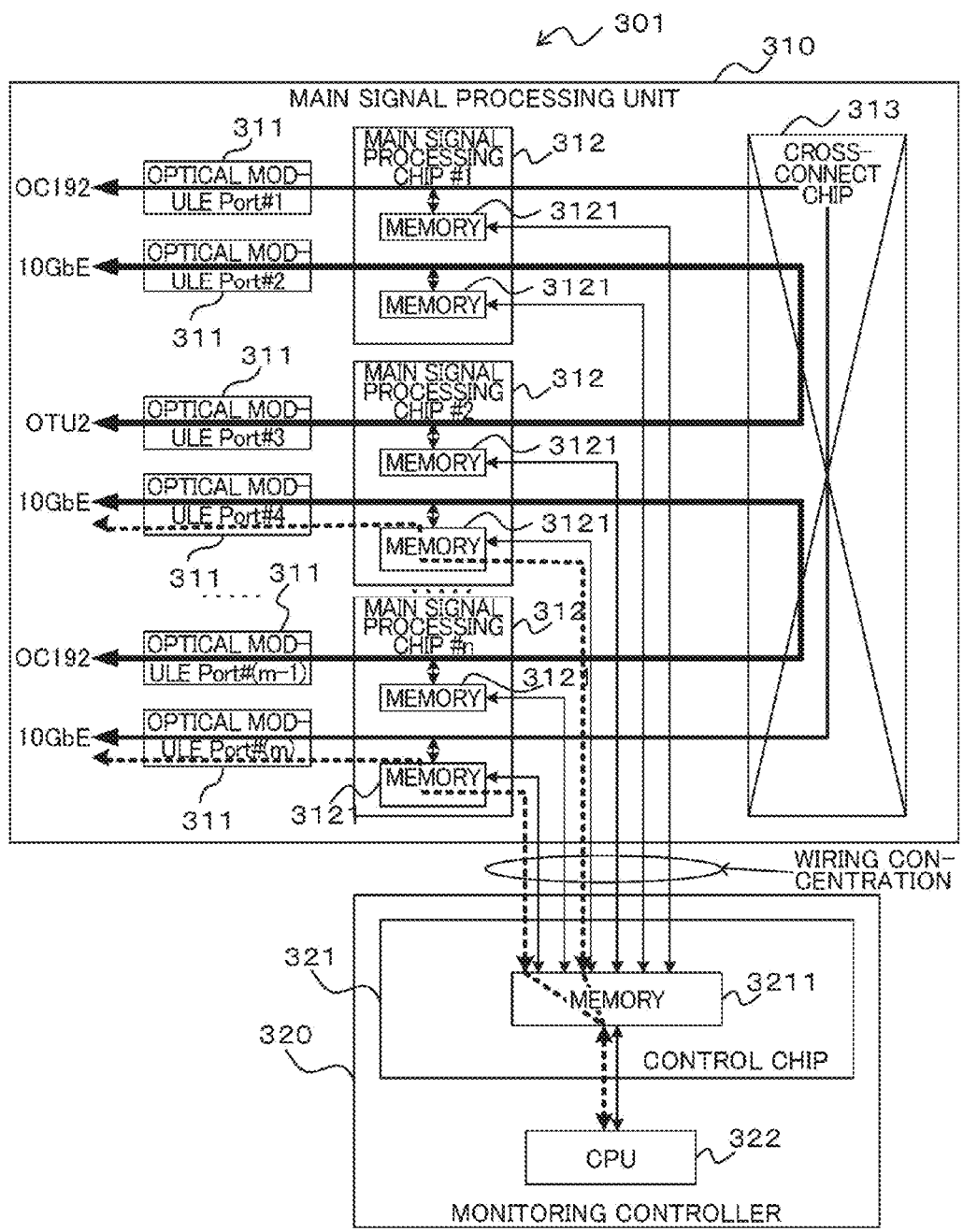
FIG. 14 is a block diagram illustrating an exemplary configuration of an interface board used for a transport apparatus illustrated in FIG. 13.

FIG. 14 illustrates one example of an interface board 301 used for a transport apparatus 300.

The interface board 301 includes a main signal processing unit 310 for processing a main signal and a monitoring controller 320 for processing a monitoring control signal.

The main signal processing unit 310 includes, for example, an optical module 311, a main signal processing chip (main signal processing circuit) 312 and a cross-connect chip (cross-connect circuit) 313.

Illustratively, the optical module 311 is provided for each of a plurality of ports #1 to #m (m is an integer of 2 or more) and can process signals corresponding to a variety of protocols such as OC192, 10 gigabit Ethernet signal (10 GbE), OTU2 and so on.

For example, the main signal processing chip 312 is provided with the number n (#1 to #n) which is smaller than the number m of the optical module 311, and a single main signal processing chip 312 can process signals transmitted to and from a plurality of optical modules 311 (a single main signal processing chip 312 processes signals transmitted to and from two optical modules 311 in the example of FIG. 14). The main signal processing chip 312 can switch its own function according to an interface protocol.

The cross-connect chip 313 can connect main signals between any ports #i (i=1 to m) and determines a main signal path.

In the meantime, for example, the monitoring controller 320 includes a control chip 321 and a CPU 322.

As an example of a control circuit, the control chip 321 classifies the control signals transmitted from the CPU 322, and aggregates and transmits the control signals transmitted from the main signal processing chips 312 to the CPU 322. The above-mentioned Ethernet monitoring control frames are also transmitted and received between the CPU 322 and the main signal processing chip 312.

The Ethernet monitoring control frame transmitted from the CPU 322 to each port #i is stored temporarily in a memory 3211 of the control chip 312. The control chip 321 determines port #i to which the monitoring control frame is transmitted, based on destination information (DA: Destination Address) of the monitoring control frame, and outputs the monitoring control frame to a memory 3121 provided for each port #i of the main signal processing chip 312.

The memory 3211 of the control chip 321 and the memory 3121 for each port #i of the main signal processing chip 312 are interconnected by a memory interface signal for each port #i. An example of the interface signal may include a RGMII (Reduced Gigabit Media Independent Interface).

When the RGMII signal is used, 12 wirings are required per port. Accordingly, for example, a board provided with an interface having 20 ports requires the total of 240 wirings and, as a result, the number of terminals increases, which may result in increase in the costs. In addition, these wirings are radially connected from one control chip 321 to the main signal processing chip 312, which may result in increase in the number of layers of a printed wiring board and the production costs.

As an example of techniques for reducing the number of wirings, the SGMII (Serial Gigabit Media Independent Interface) may be used, in which case high speed serial interface transceivers corresponding to the number of ports need to be used for the control chip 321. The chip provided with a plurality of high speed serial interface transceivers tends to be expensive to cause an increase in additional costs of the control chip 312.

The Ethernet monitoring control frame stored in the memory 3121 of the main signal processing chip 312 is inserted in a predetermined position of the main signal frame and is transmitted to a correspondent Ethernet termination unit 501. In contrast, the Ethernet monitoring control frame transmitted from the correspondent Ethernet termination unit 501 is extracted from the main signal frame and stored in the memory 3121 of the main signal processing chip 312.

The Ethernet monitoring control frame stored in the memory 3121 of the main signal processing chip 312 is transmitted to the memory 3211 of the control chip 321 by the above-mentioned memory interface signal. In this case, reducing the number of wirings or the number of high speed serial interface transceivers becomes one of important issues.

Subsequently, the monitoring control frame stored in the memory 3211 of the control chip 321 is transmitted to the CPU 322. In this case, since the monitoring control frame transmitted from the correspondent Ethernet termination unit 501 is transmitted asynchronously, it may be possible that the control chip 321 may simultaneously and continuously receive the monitoring control frame from multiple ports #i in the worst case.

Therefore, the memory 3211 of the control chip 321 requires a high burst resistance and large memory capacity. The memory capacity increases in proportion to the number of ports, and the memory capacity of the control chip 321 increases in the configuration with the multi-port board 301 forcing to use an expensive chip.

It may be contemplated that the memory capacity of the control chip 321 is distributed in the main signal processing chip 312. In this case, however, a flow control needs to be performed between the main signal processing chips 312 so as to prevent the occurrence of overflow in the memory 3211 of the control chip 321, which may result in a complicated circuit configuration.

In addition, when monitoring control frames are received from one port in a burst and retained in the memory 3211 of the control chip 321, additional monitoring control frames may be received from another port. In this case, the delay time of the frames may be increased before the frames are processed in the CPU 322. Although an adjustment may be made between ports #i to avoid such a situation, the adjustment may result in a complicated circuit configuration.

Hereinafter, embodiments regarding techniques for reducing the number of wirings used to cause transmission of a monitoring control signal between a main signal processing circuit and a monitoring controller in a transport apparatus will be described with reference to the drawings. The embodiments disclosed herein are illustrative only but are not intended to exclude various modifications and technical applications that are not specifically described herein. Throughout the drawings used to describe the following embodiments, the same or similar elements are denoted by the same reference numerals unless otherwise stated.

First Embodiment

Figure 1:
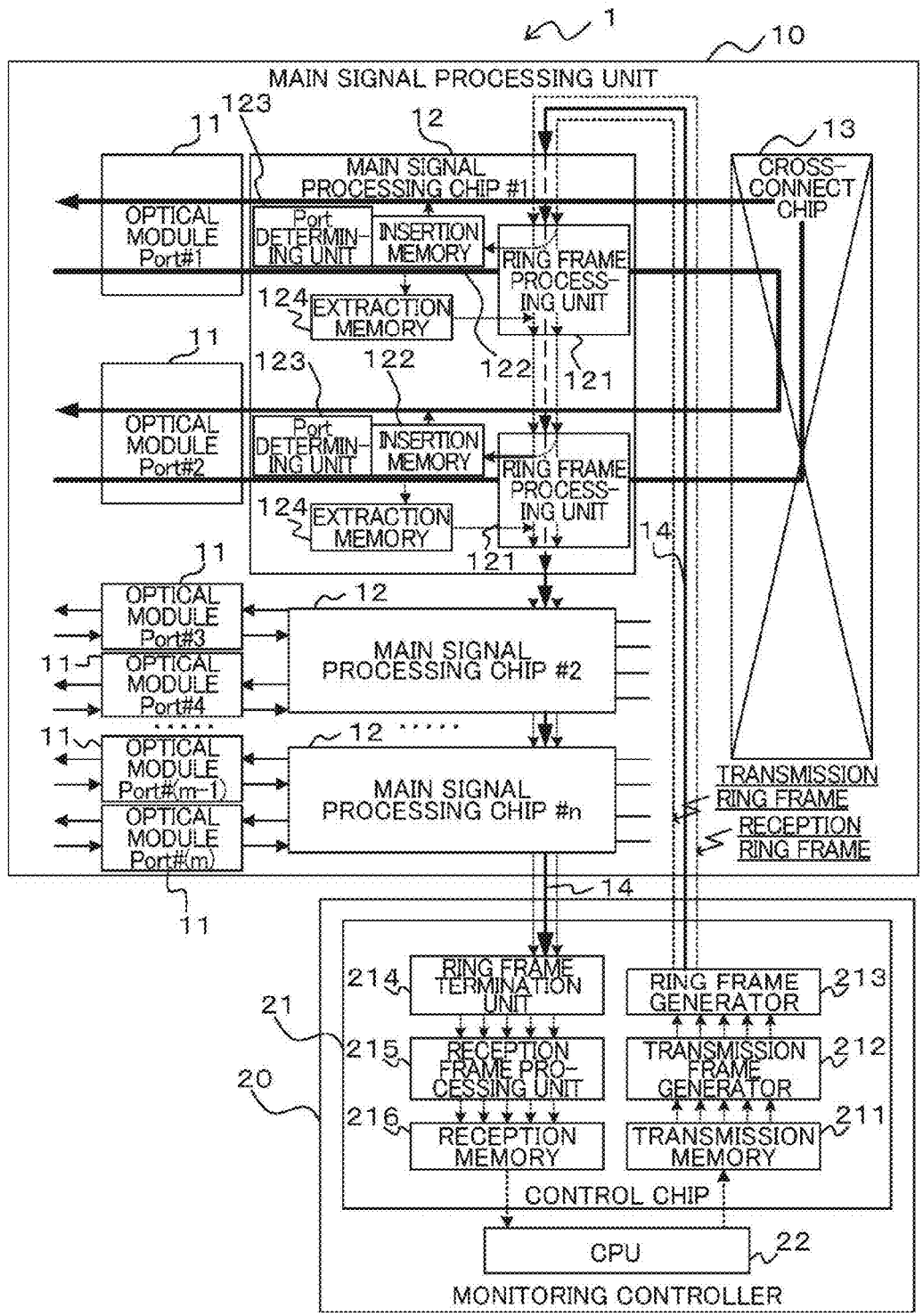
FIG. 1 is a block diagram illustrating an exemplary configuration of an interface board used for a transport apparatus according to a first embodiment.
Figure 13:
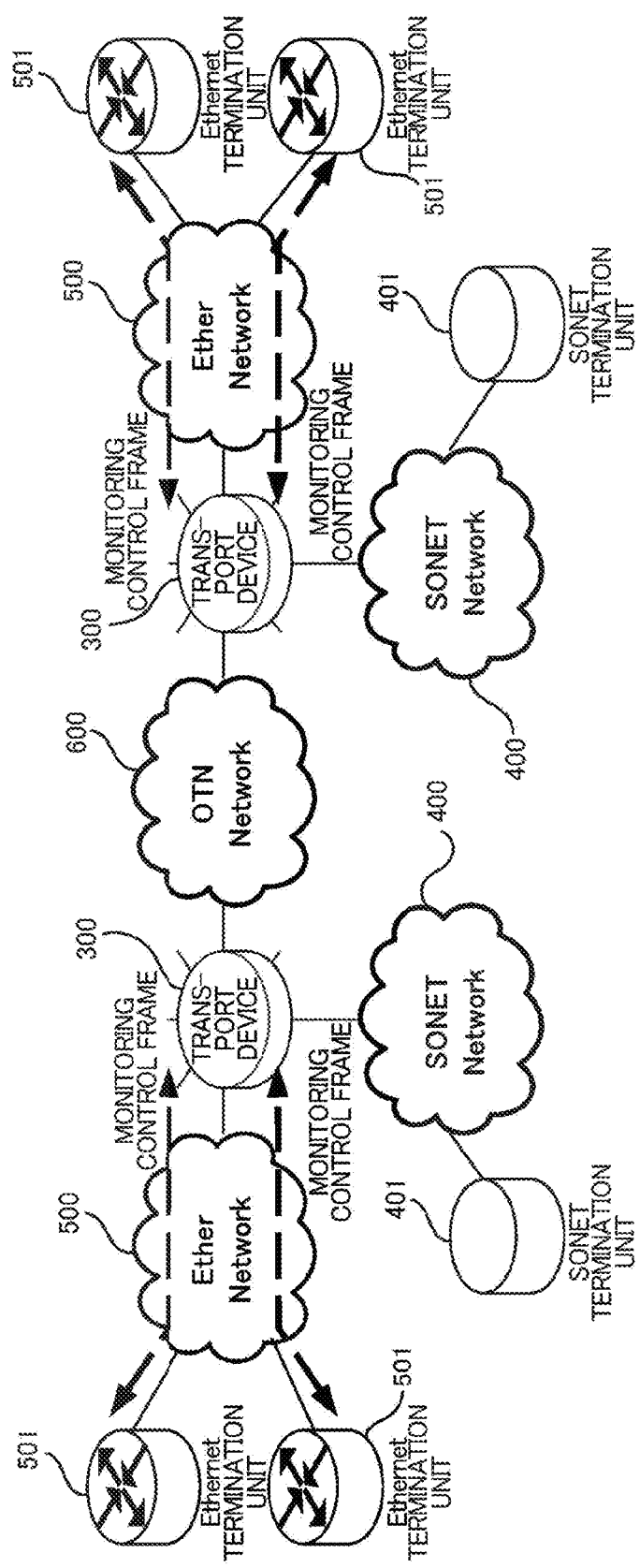
FIG. 13 is a view illustrating an example of network configuration.

FIG. 1 is a block diagram illustrating an exemplary configuration of an interface board used for a transport apparatus according to a first embodiment. For example, an interface board 1 illustrated in FIG. 1 may be used for the transport apparatus 300 as illustrated in FIG. 13 and includes a main signal processing unit 10 for processing a main signal and a monitoring controller 20 for processing a monitoring control signal.

The main signal processing unit 10 may include an optical module (optical transceiver) 11, a main signal processing chip (main signal processing circuit) 12 and a cross-connect chip (cross-connect circuit) 13.

The optical module 11 may be provided for each of a plurality of ports #1 to #m (m is an integer of 2 or more) and process signals corresponding to a variety of protocols such as OC192, 10 gigabit Ethernet signal (10 GbE), and OTU2. The optical module 11 that processes an Ethernet signal communicates with an Ethernet termination unit (see, for example, reference numeral 501 in FIG. 13) which is illustrated as an example of a correspondent device.

A plurality of the signal processing chips 12 may be provided. For example, the main signal processing chip 12 may be provided with the number n (#1 to #n) which is smaller than the number m of the optical module 311 and a single main signal processing chip 312 can process signals transmitted to and from a plurality of optical modules 11 (two optical modules 11 in the example of FIG. 1). The main signal processing chip 312 can switch its own function according to an interface protocol.

For example, the main signal processing chip 12 that processes an Ethernet signal as a main signal extracts a monitoring control signal (monitoring control frame) inserted in a main signal received from the correspondent device and performs a process of inserting the monitoring control frame into a main signal transmitted to the correspondent device.

The main signal processing chips 12 may be provided in one-to-one correspondence with the ports #1 to #m.

The cross-connect chip 13 may connect the main signals between any ports #i (i=1 to m) and determine a main signal path.

The main signal processing chips 12 (#1 to #n) are connected in a daisy chain form to the monitoring controller 20 (a control chip 21 which will be described later) by a ring-shaped serial bus (hereinafter referred to as a "ring bus") 14. That is, a serial signal output from the monitoring controller 20 is input to the first main signal processing chip 12 (#1) via the ring bus 14. An output of the first main signal processing chip 12 (#1) is input to the second main signal processing chip 12 (#2) via the ring bus 14. In the same way, an output of the (n−1)-th main signal processing chip 12 (#(n−1)) is input to the n-th main signal processing chip 12 (#n) via the ring bus 14. An output of the n-th main signal processing chip 12 (#n) located in the last stage is input to the monitoring controller 20 (the control chip 21) via the ring bus 14. The ring bus 14 is one example of a serial interface.

A configuration of a main signal processing chip (hereinafter sometimes abbreviated as a "main signal chip") 12 will be described below.

The monitoring controller 20 includes a control chip 21 and a CPU 22. As an example of a control circuit, the control chip 21 transmits a serial frame having a format to be described later with reference to FIG. 4 (hereinafter sometimes referred to as a "ring frame") to the ring bus 14. In addition, the control chip 21 receives a serial frame received from the ring bus 14 via each main signal processing chip 12.

As an example of an operation processing unit, the CPU 22 generates a monitoring control frame mapped to the serial frame and outputs the monitoring control frame to the control chip 21. In addition, the CPU 22 receives the monitoring control frame extracted from the serial frame in the control chip 21.

The control chip 21 may include a transmission memory 211, a transmission frame generator 212 and a ring frame generator 213 as a frame transmission side (a transmitting unit of serial frames).

The transmission memory 211 temporarily stores the monitoring control frames generated in the CPU 22.

The transmission frame generator 212 determines which port #i the monitoring control frame stored in the transmission memory 211 is transmitted to, based on destination information (DA: Destination Address) of the monitoring control frame. Then, the transmission frame generator 212 generates a (transmission) intermediate frame illustrated in FIG. 3 which is assigned with an identifier of the determined port #i (a port identifier (Port ID)) and a frame length (Length) as information for identifying the length of the monitoring control frame. The intermediate frame is output to the ring frame generator 213.

Figure 4:
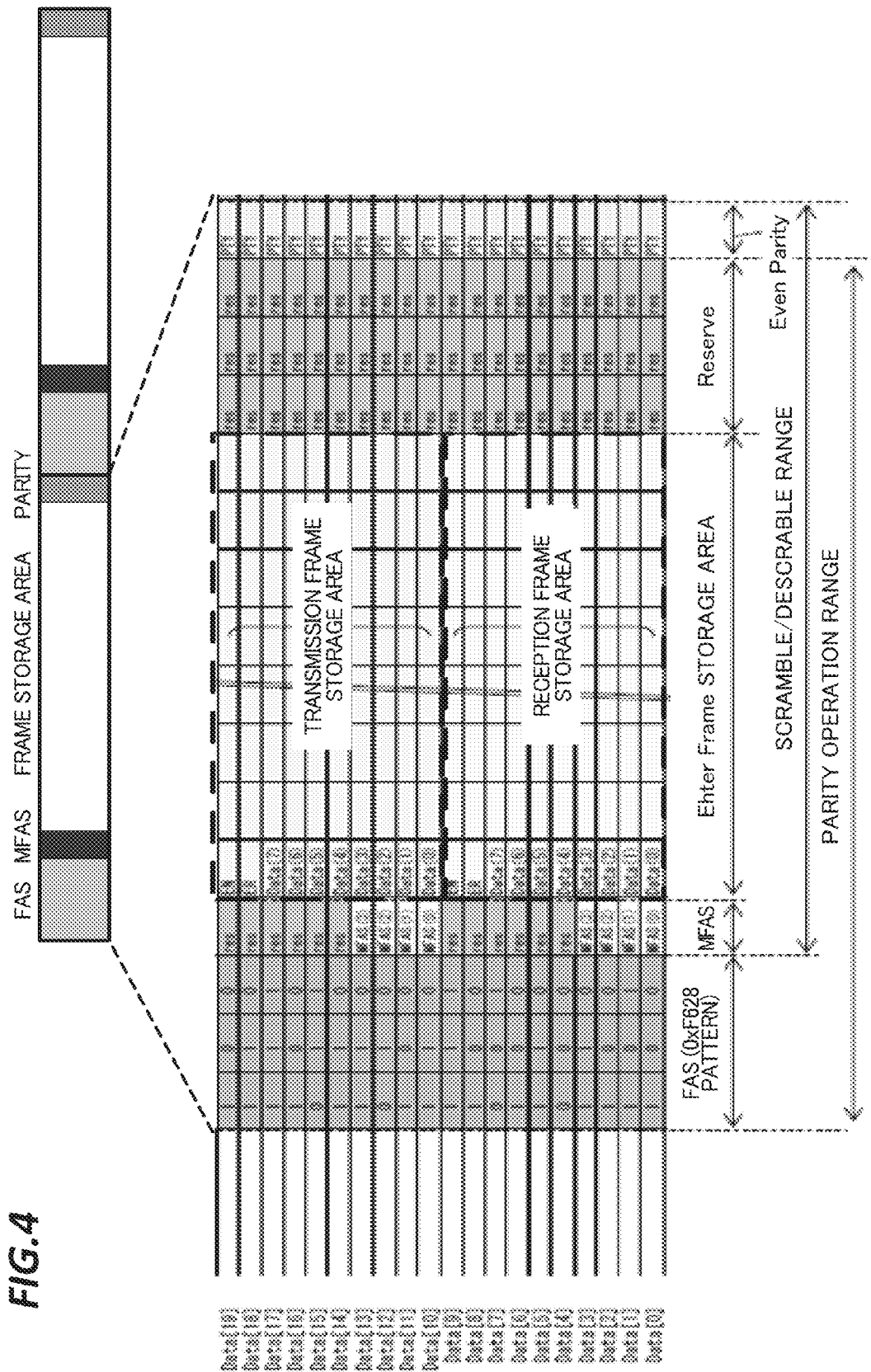
FIG. 4 is a view illustrating an example of a format of a serial frame (ring frame) generated in the control chip illustrated in FIG. 1.

The ring frame generator (serial frame generator) 213 generates a serial frame (ring frame) illustrated in FIG. 4 in which a transmission intermediate frame and a reception intermediate frame are mapped. The ring frame may be a multi-frame and have a FAS (Frame Alignment Signal), a MFAS (Multi-Frame Alignment Signal), a signal stored in a frame storage area, and a parity signal.

The FAS is a signal indicating a head position of the ring frame and has a predetermined pattern (for example, 0Xf628 in hexadecimal). The MFAS is a signal indicating a multi-frame number for identifying a port #i and is used for mapping on a per port #i basis for the reception intermediate frame which will be described later.

The frame storage area (mapping field) is divided into two bands, i.e., a reception frame storage area (reception mapping field) and a transmission frame storage area (transmission mapping field). Transmission frames and reception frames in the frame storage areas are multiplexed and transmitted to the ring bus 14. By transmitting the ring frame having such a format to the ring bus in a circulative manner, it is possible to share the wires for transmitting the monitoring control frame in each port #1 and a transmission/reception.

The parity may be even parity and a parity operation may be performed for the ring frame from which the parity signal is excluded. A scrambling or descrambling operation is performed for the ring frame from which the FAS and the parity signal are excluded.

Figure 3:
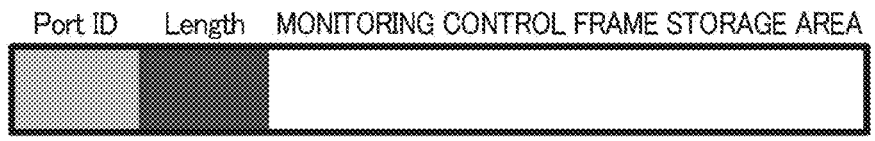
FIG. 3 is a view illustrating an example of a format of an intermediate frame generated in a control chip illustrated in FIG. 1.
Figure 5:
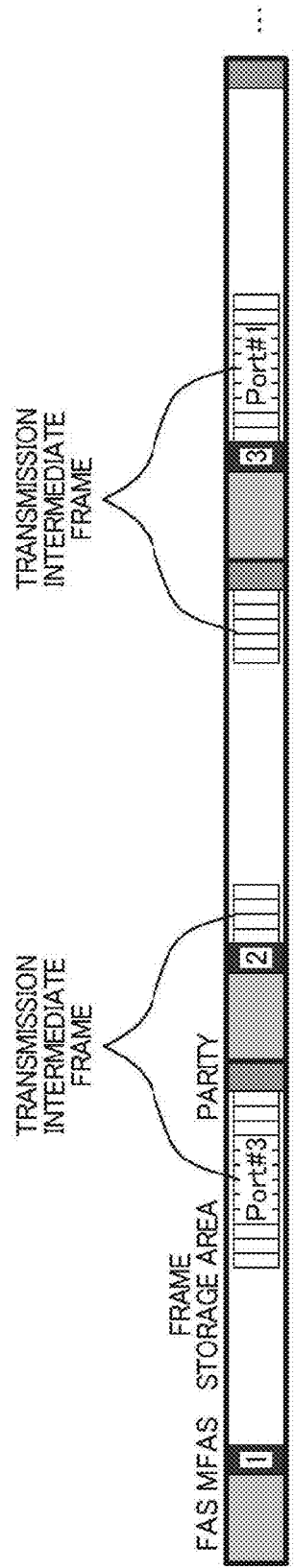
FIG. 5 is a view illustrating an example of a mapping of a transmission intermediate frame to the serial frame illustrated in FIG. 4.

The transmission intermediate frame illustrated in FIG. 3 is stored in the transmission frame storage area. FIG. 5 illustrates an example of mapping of the transmission intermediate frame. The transmission intermediate frame is mapped to an area excluding the FAS, MFAS and parity signal of the ring frame, and is transmitted to the main signal processing chip 12 via the ring bus 14. In the meantime, the reception frame storage area is transmitted from the control chip 21 while being vacant.

The transmission intermediate frame may be mapped to be accommodated in one transmission frame storage area. Alternatively, the transmission intermediate frame may be mapped over a plurality of transmission frame storage areas. In comparison with a reception monitoring control frame which is likely to be received in a burst, the transmission intermediate frame (transmission monitoring control frame) to each port #i may be mapped over the plurality of transmission frame storage areas since an arbitration of the transmission has been already completed by the CPU 22. For example, FIG. 5 illustrates a state where the transmission intermediate frame to the port #3 is mapped over the first and second transmission frame storage areas and the transmission intermediate frame to the port #1 is mapped over the second and third transmission frame storage areas.

Referring back to FIG. 1, for example, a frame reception side (serial frame receiver) of the control chip 21 includes a ring frame termination unit 214, a reception frame processing unit 215 and a reception memory 216.

The ring frame termination unit 214 detects the FAS of the ring frame received via the ring bus 14 and extracts a monitoring control frame mapped to the reception intermediate frame in any of the main signal processing chips 12. The extracted monitoring control frame is output to the reception frame processing unit 215.

The reception frame processing unit 215 encapsulates the monitoring control frame extracted by the ring frame termination unit 214 into the Ethernet frame and stores it in the reception memory 216.

The reception memory 216 outputs the stored Ethernet frame to the CPU 22.

Next, a configuration of the main signal processing chip 12 will be described. As illustrated in FIG. 1, each of the main signal processing chips 12 includes a ring frame processing unit 121, an insertion memory 122, a port determining unit 123 and an extraction memory 124, all of which are provided to correspond to any port #i.

The ring frame processing unit 121 extracts (de-maps) the transmission intermediate frame mapped to the transmission frame storage area of the ring frame received from the ring bus 14, as one example of operation of the frame transmission side. The extracted transmission intermediate frame is stored in the insertion memory 122. In addition, the ring frame processing unit 121 determines a reception frame storage area into which the reception intermediate frame to the CPU 22 is mapped, based on the MFAS of the received ring frame, as one example of operation of the frame reception side. Then, the ring frame processing unit 121 maps the reception intermediate frame stored in the extraction memory 124 into the reception frame storage area determined to be mapped.

The insertion memory 122 inserts the stored transmission intermediate frame (monitoring control frame) in a predetermined position of the main signal area, according to an insertion instruction from the port determining unit 123.

The port determining unit 123 determines whether a port identifier assigned to the transmission intermediate frame matches its own responsible port identifier. When it is determined that the port identifier matches with its own responsible port identifier, an instruction to insert the transmission intermediate frame into the insertion memory 122 is issued from the port determining unit 123. When, however, it is determined that the port identifier does not match with its own responsible port identifier, the transmission intermediate frame stored in the insertion memory 122 is discarded (e.g., overwritten) without issuing the instruction to insert the transmission intermediate frame into the insertion memory 122.

The extraction memory 124 stores the monitoring control frame inserted in a predetermined position of the main signal region received from the optical module 11.

Further, some or all of the insertion memory 122, the port determining unit 123 and the extraction memory 124 may be provided within the ring frame processing unit 121.

Figure 2:
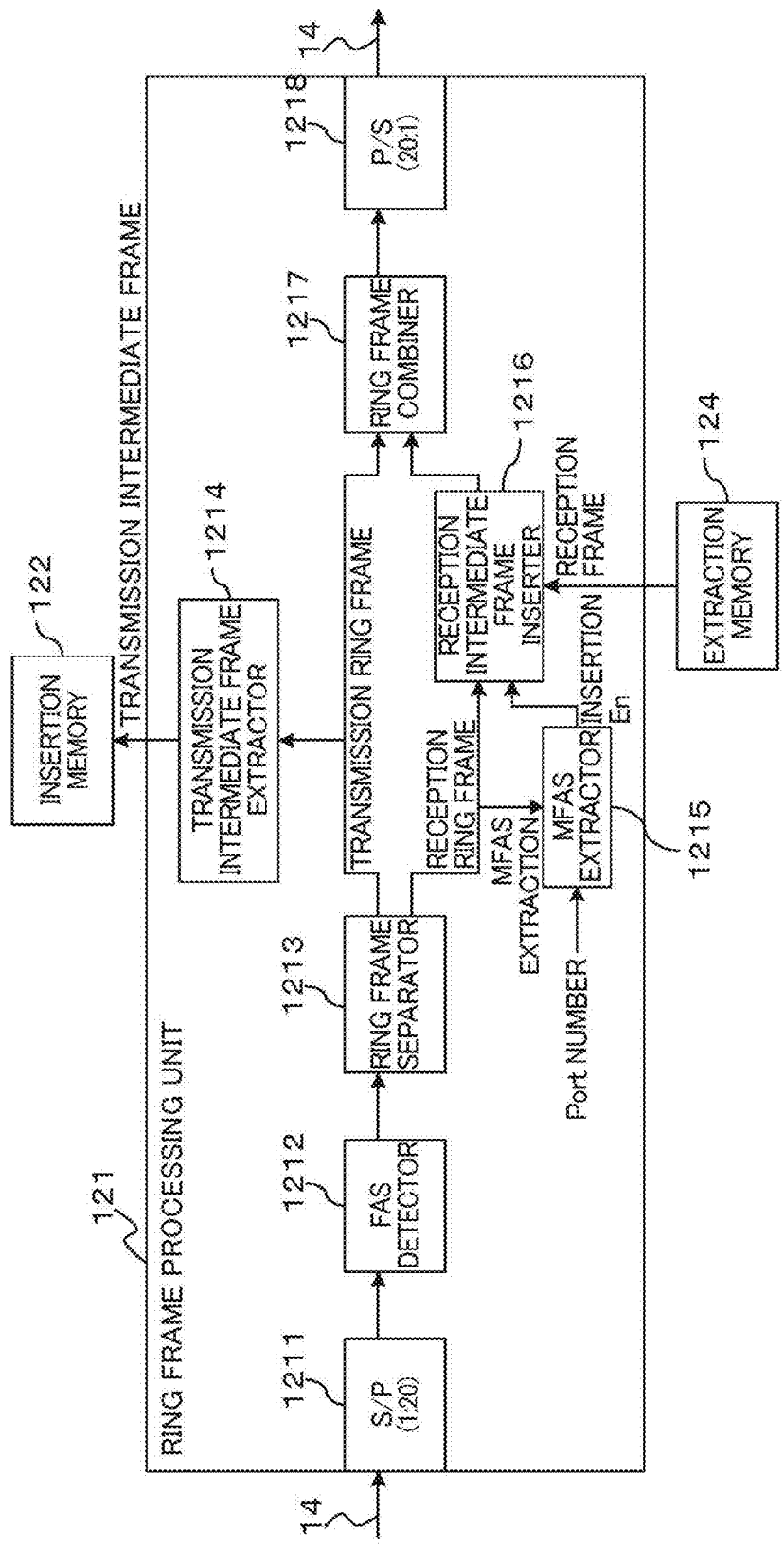
FIG. 2 is a block diagram illustrating an exemplary configuration of a ring frame processing unit illustrated in FIG. 1.

FIG. 2 illustrates an exemplary configuration of the ring frame processing unit 121. For example, the ring frame processing unit 121 illustrated in FIG. 2 includes a serial/parallel (S/P) converter 1211, a FAS detector 1212, a ring frame separator 1213, a transmission intermediate frame extractor 1214, a MFAS extractor 1215, a reception intermediate frame inserter 1216, a ring frame combiner 1217 and a parallel/serial (P/S) converter 1218.

The S/P converter 1211 converts a ring frame received from the ring bus 14 into parallel signals. Here, for example, one received ring frame is converted into 20 parallel signals.

The FAS detector 1212 detects a head position (FAS) of the received ring frame from the 20 parallel signals converted by the S/P converter 1211.

The ring frame separator 1213 separates the received ring frame into signals of the transmission frame storage area and the reception frame storage area as illustrated in FIG. 4, based on the FAS detected by the FAS detector 1212. That is, the ring frame separator 1213 separates the 20 parallel signals into 10 transmission ring frame signals corresponding to the transmission frame storage area and 10 reception ring frame signals corresponding to the reception frame storage area.

The transmission intermediate frame extractor 1214 extracts a transmission intermediate frame from the transmission ring frame signals separated by the ring frame separator 1213 and stores the transmission intermediate frame in the insertion memory 122.

The MFAS extractor 1215 extracts the MFAS from the 10 reception frame signals separated by the ring frame separator 1213 and compares the extracted MFAS with its own port identifier. If the MFAS matches the port identifier, the MFAS extractor 1215 generates an insertion enable (En) signal and the reception intermediate frame inserter 1216 is assigned with the generated insertion enable signal.

Upon receiving the insertion enable signal from the MFAS extractor 1215, the reception intermediate frame inserter 1216 reads the reception monitoring control frame stored in the extraction memory 124. Then, the reception intermediate frame inserter 1216 maps the reception intermediate frame assigned with the port identifier and a frame length for the read monitoring control frame to the reception frame storage area of the reception ring frame signals.

Figure 6:
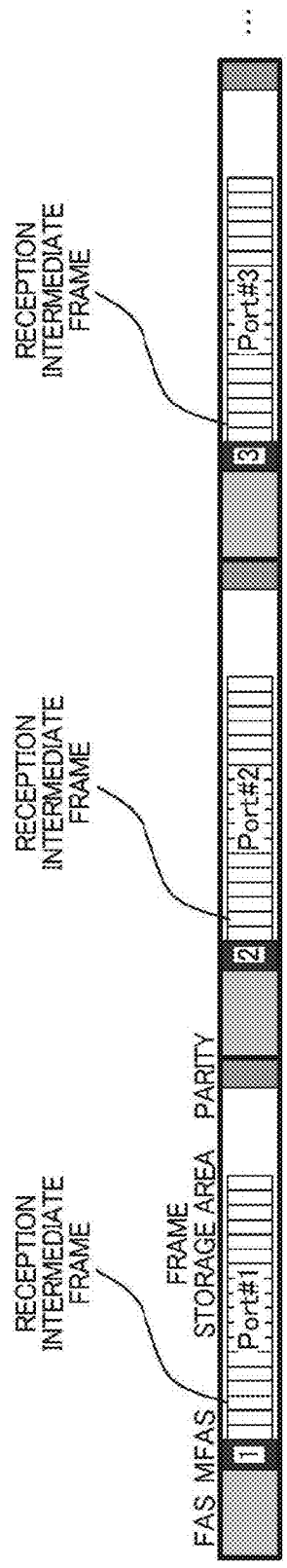
FIG. 6 is a view illustrating an example of a mapping of a reception intermediate frame to the serial frame illustrated in FIG. 4.

FIG. 6 illustrates an example of the mapping of the reception intermediate frame. The reception intermediate frame is mapped to the reception frame storage area in which the MFAS of the ring frame matches its own port number but is not mapped to an area in which the MFAS does not match its own port number.

In this manner, by determining an area in which the reception intermediate frame can be mapped (transmitted) for each port #i, it is possible to transmit the reception frame (reception monitoring control frame) to the CPU 22 in a specified delay time even if a different port competes with the frame reception. This facilitates a delay design.

In addition, in preparation for a case where a monitoring control frame is received in a burst format at any port #i, the extraction memory 124 of the main signal processing chip 12 requires a high burst resistance. In the above example, since a period during which the reception intermediate frame may be transmitted is determined for each port #i, it is possible to design the burst resistance at individual ports #i without considering competition with other ports. This allows a simplified circuit configuration and the capacity of the reception memory 216 of the control chip 21 may be reduced as compared to the conventional configuration in which memories are arranged to be concentrated in the control chip.

The ring frame combiner 1217 combines the 10 transmission frame signals and the 10 reception ring frame signals to which the reception intermediate frame is mapped in the reception intermediate frame inserter 1216.

The P/S converter 1218 converts the 20 parallel signals combined by the ring frame combiner 1217 into a serial signal and outputs a serial ring frame to the main signal processing chip 12 or the monitoring controller 20 in the subsequent stage.

Figure 7:
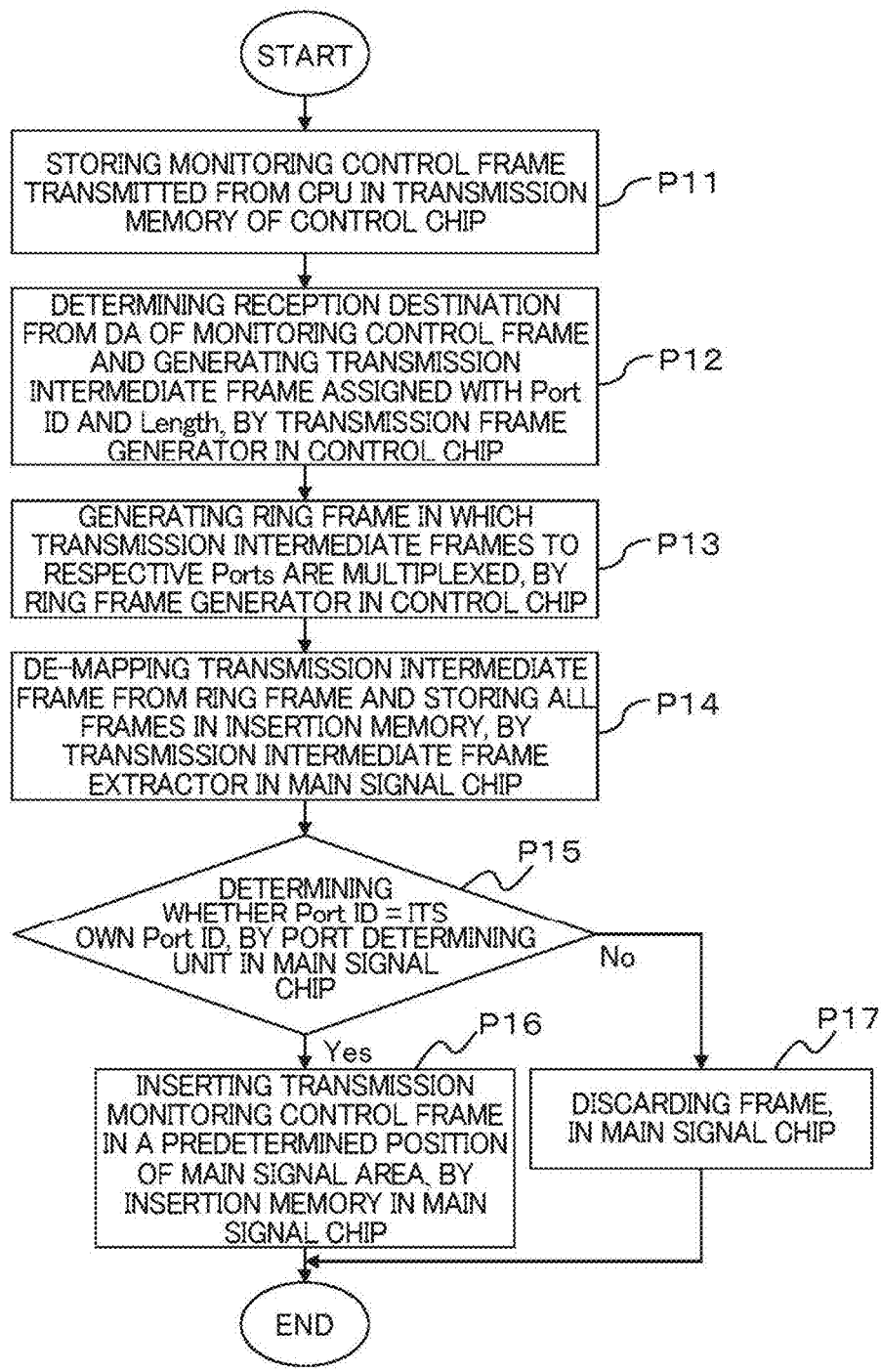
FIG. 7 is a flow chart for explaining an example of monitoring control frame transmission operation according to the first embodiment.
Figure 8:
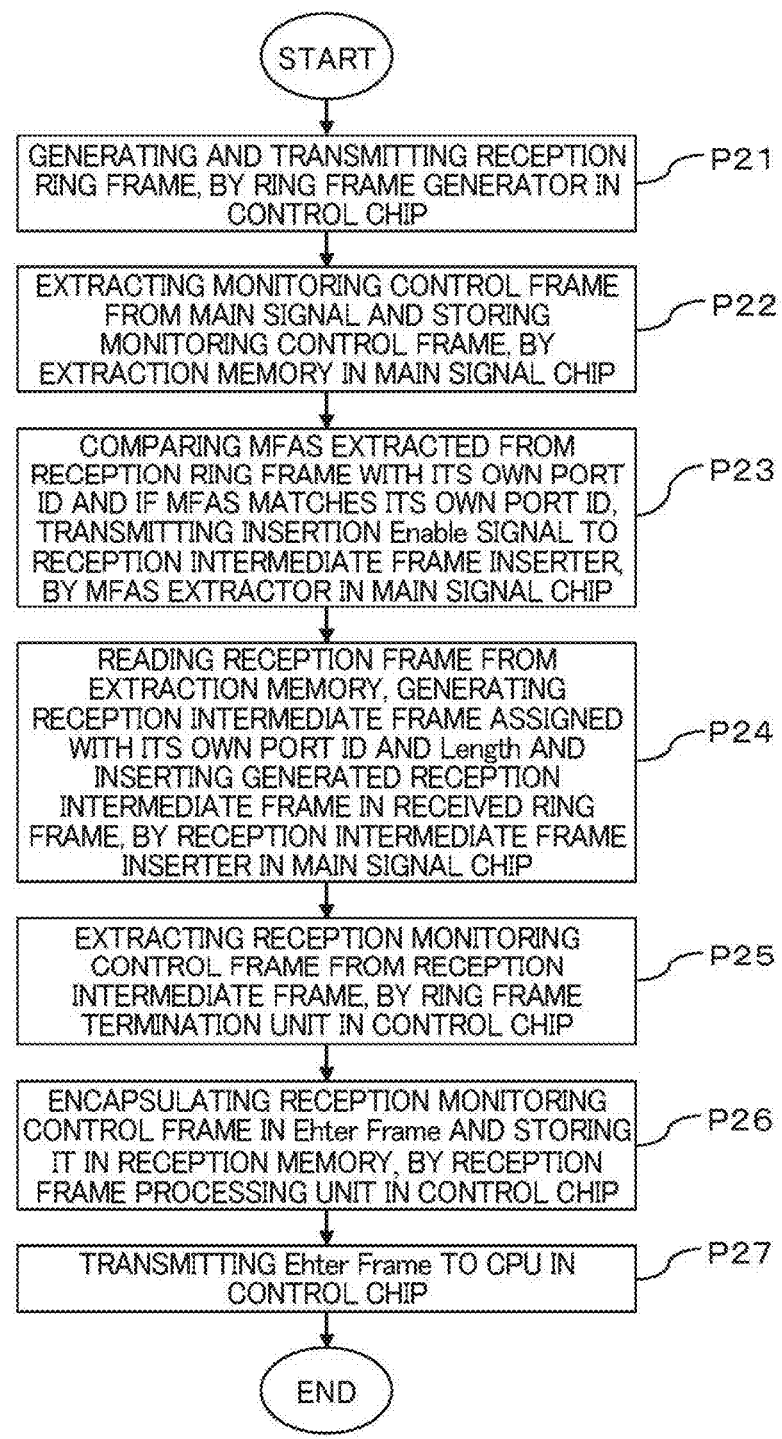
FIG. 8 is a flow chart for explaining an example of monitoring control frame reception operation according to the first embodiment.

Hereinafter, an example of operation of the above-configured interface board 1 will be described with reference to FIGS. 7 and 8. FIG. 7 is a flow chart illustrating one example of monitoring control frame transmission operation and FIG. 8 is a flow chart illustrating one example of monitoring control frame reception operation.

Transmission Operation Example of Monitoring Control Frame

As illustrated in FIG. 7, in the monitoring controller 20, when the CPU 22 generates a monitoring control frame, the monitoring control frame is stored in the transmission memory 211 of the control chip 21 (Operation P11).

The monitoring control frame stored in the transmission memory 211 is read by the transmission frame generator 212. The transmission frame generator 212 determines a reception destination (port #i) from the DA of the read monitoring control frame and generates a transmission intermediate frame (see, for example, FIG. 3) assigned with a port identifier and a frame length (Operation P12).

The generated transmission intermediate frame is input to the ring frame generator 213. The ring frame generator 213 generates a ring frame (see, for example, FIG. 4) in which transmission intermediate frames to respective ports #i are multiplexed and transmits the ring frame to the ring bus 14 (Operation P13).

Upon receiving the ring frame from the ring bus 14, the main signal processing chip 12 de-maps the transmission intermediate frame from the received ring frame by means of the transmission intermediate frame extractor 1214 (see, for example, FIG. 2) of the ring frame processing unit 121. The de-mapped transmission intermediate frame is stored in the insertion memory 122 (Operation P14).

Then, the port determining unit 123 determines whether the port identifier assigned to the transmission intermediate frame stored in the insertion memory 122 matches its own port identifier (Operation P15).

When it is determined that the port identifier matches its own port identifier ("YES" at Operation P15), the port determining unit 123 issues an instruction to insert the transmission intermediate frame into the insertion memory 122. Thus, the transmission intermediate frame including the monitoring control frame is inserted in a predetermined position of the main signal area and transmitted to the optical module 11 at the port #i (Operation P16).

Otherwise, when it is determined that the port identifier does not match its own port identifier ("NO" at Operation P15), the transmission intermediate frame is discarded (for example, overwritten) without issuing the instruction to insert the transmission intermediate frame into the insertion memory 122 from the port determining unit 123 (Operation P17).

Reception Operation Example of Monitoring Control Frame

As illustrated in FIG. 8, a ring frame is generated by the ring frame generator 213 in the control chip 21 of the monitoring controller 20 and transmitted to the ring bus 14 (Operation P21).

In the main signal processing chip 12, a monitoring control frame is extracted from the main signal received from the optical module 11 and is stored in the extraction memory 124 (Operation P22).

Moreover, the main signal processing chip 12 extracts MFAS of the ring frame received from the ring bus 14 by means of the MFAS extractor 1215 (see, for example, FIG. 2) and compares the extracted MFAS with its own port identifier. If the MFAS matches the port identifier, the MFAS extractor 1215 transmits an insertion enable signal to the reception intermediate frame inserter 1216 (Operation P23).

Upon receiving the insertion enable signal from the MFAS extractor 1215, the reception intermediate frame inserter 1216 reads a reception monitoring control frame from the extraction memory 124 and generates a reception intermediate frame assigned with its own port identifier and a frame length for the read monitoring control frame. Then, the reception intermediate frame inserter 1216 inserts (maps) the generated reception intermediate frame in the received ring frame (Operation P24).

The ring frame to which the reception intermediate frame is mapped is received in the control chip 21 of the monitoring controller 20 via the ring bus 14. In the control chip 21, the FAS of the received ring frame is detected by the ring frame termination unit 214 and a reception monitoring control frame is extracted from the reception intermediate frame mapped to the reception frame storage area (Operation P25).

The extracted reception monitoring control frame is encapsulated in an Ethernet® frame in the reception frame processing unit 215, temporarily stored in the reception memory 216 (Operation P26), and then output to the CPU 22 (Operation P27).

At this time, an arbitration between ports #i or smoothing of the burst frame has been already completed at the point of time when the reception intermediate frame is mapped to the ring frame in the main signal processing chip 12. Therefore, it is sufficient if the reception memory 216 of the control chip 21 has capacity to the extent that it can store several Ethernet frames.

As described above, according to the first embodiment, since the monitoring controller 20 (the control chip 21) and the main signal processing chips 12 are connected in the ring form by the ring bus (serial bus) 14, it is possible to reduce the number of wirings between the main signal processing unit 10 and the monitoring controller 20.

Accordingly, it is possible to reduce the number of wiring board layers in the interface board 1. In addition, since it is not necessary to use a high speed serial interface transceiver, it is possible to transmit a monitoring control signal between the main signal processing unit 10 and the monitoring controller 20 with a relatively inexpensive structure.

Further, a multi-ring frame can be transmitted from the control chip 21 to the ring bus 14 and, in the ring frame processing unit 121 corresponding to each port #i, a reception intermediate frame can be mapped to a multi-frame corresponding to its own port identifier. Accordingly, it is possible to implement an arbitration of monitoring control frames between ports #i with a simple structure. In other words, the reception monitoring control frames at the ports #i can be evenly transmitted to the monitoring controller 20 (the CPU 22) with a simple circuit configuration. Furthermore, the maximum amount of delay is fixed, thereby facilitating a memory design.

Moreover, since the memory capacity which has been conventionally concentrated in a control chip can be distributed over the main signal processing chips 12 without adding a complicated circuit, it is possible to significantly reduce the memory capacity of the control chip 21 and use relatively inexpensive chips.

Second Embodiment

In a case where the main signal processing chips 12 are configured by the FPGA, a protocol switching may be performed by re-configuration in the unit of port #i or the unit of main signal processing chip 12. In this case, the ring bus 14 may be disconnected in the way so that a monitoring control frame cannot be delivered to ports not subjected to protocol switching. In order to avoid such an event, a second embodiment of the present disclosure adopts a bidirectional ring bus 14.

Figure 9:
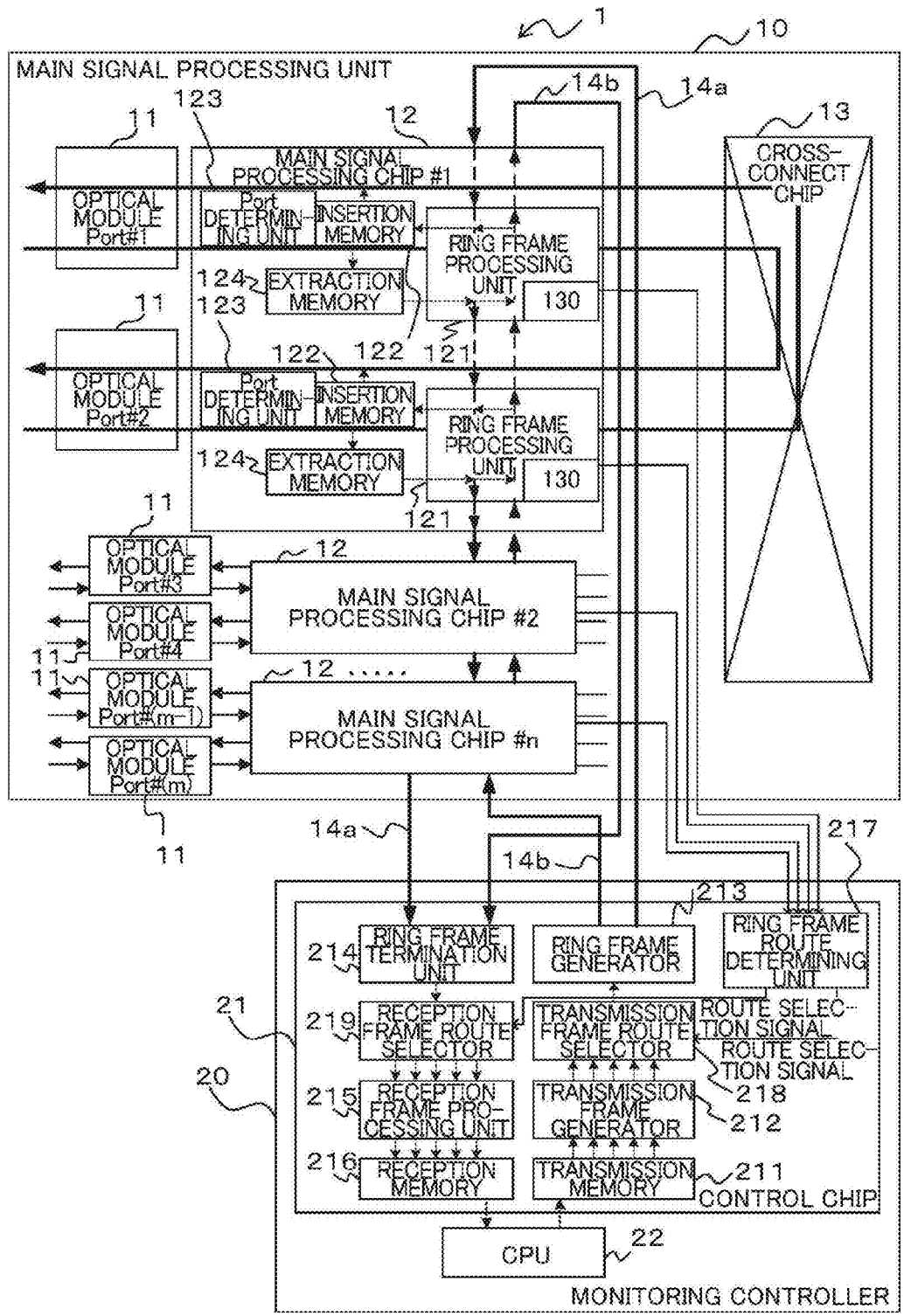
FIG. 9 is a block diagram illustrating an exemplary configuration of an interface board used for a transport apparatus according to a second embodiment.

FIG. 9 is a block diagram illustrating an exemplary configuration of an interface board 1 used for a transport apparatus according to the second embodiment. The configuration illustrated in FIG. 9 is different from that illustrated in FIG. 1 in that the former includes bidirectional ring buses 14a and 14b. Numeral reference 130 represents ring disconnection information.

One ring bus 14a transmits a ring frame from the control chip 21 to the main signal processing chips #1, #2, . . . , #n in this order and inputs the ring frame to the control chip 21, as in the ring bus 14 of the first embodiment. The other ring bus 14b transmits the ring frame from the control chip 21 to the main signal processing chips #n, #(n−1), . . . , #1 in this order and inputs the ring frame to the control chip 21, as opposed to the transmission direction of the ring bus 14a.

In addition, in a case where the FPGA configuration is performed for any port #i or any main signal processing chip 12, returning of the received ring frame is performed in an adjacent port #i or an adjacent main signal processing chip 12. That is, the ring frame received from one ring bus 14a (or 14b) is returned to the other ring bus 14b (or 14a).

According to the bi-directionality of the ring bus, the functions of the ring frame processing unit 121 and the insertion memory 122 in each main signal processing chip 12 are changed from the first embodiment. Further, a ring frame route determining unit 217, a transmission frame route selector 218 and a reception frame route selector 219 are added in the control chip 21 compared to the first embodiment. Also, the functions of the ring frame generator 213 and the ring frame termination unit 214 are changed from the first embodiment.

Figure 10:
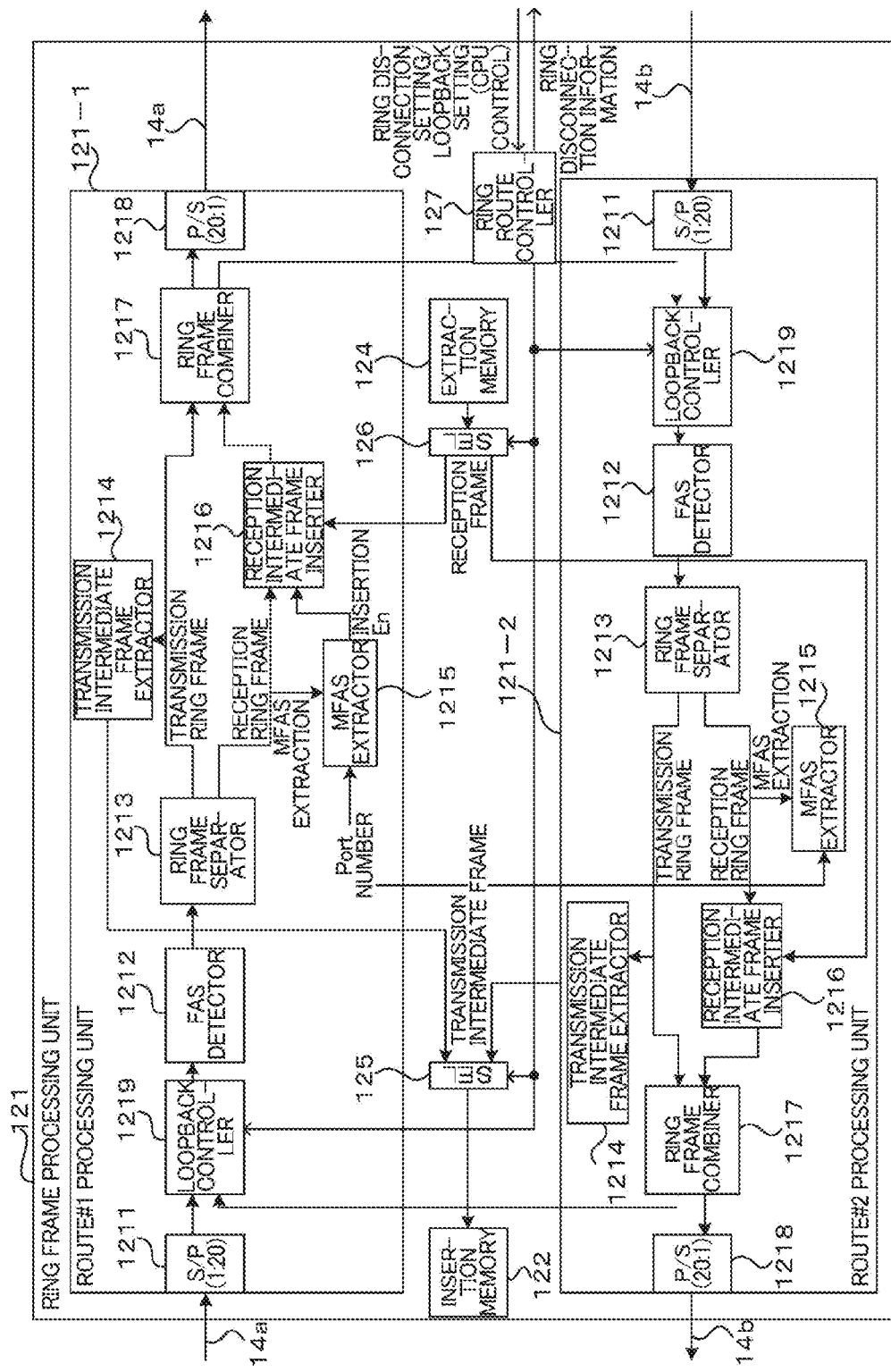
FIG. 10 is a block diagram illustrating an exemplary configuration of a ring frame processing unit illustrated in FIG. 9.

FIG. 10 illustrates an exemplary configuration of the ring frame processing unit 121 of the second embodiment. The ring frame processing unit 121 illustrated in FIG. 10 includes a route#1 processing unit 121-1, a route#2 processing unit 121-2, a transmission intermediate frame selector (SEL) 125, a reception intermediate frame selector (SEL) 126 and a ring route controller 127.

The route#1 processing unit 121-1 corresponds to one (for example, the ring bus 14a) of the bidirectional ring buses 14a and 14b and the route#2 processing unit 121-2 corresponds to the other (for example, the ring bus 14b) of the bidirectional ring buses 14a and 14b.

That is, the route#1 processing unit 121-1 performs an insertion of a reception intermediate frame (reception monitoring control frame) in the ring frame received via the ring bus 14a and an extraction of a transmission intermediate frame (transmission monitoring control frame) from the ring frame.

In the meantime, the route#2 processing unit 121-2 performs an insertion of a reception intermediate frame (reception monitoring control frame) in the ring frame received via the ring bus 14b and an extraction of a transmission intermediate frame (transmission monitoring control frame) from the ring frame.

As illustrated in FIG. 10, each of the route#1 processing unit 121-1 and the route#2 processing unit 121-2 has the same configuration as that illustrated in FIG. 2 except that each of the route#1 processing unit 121-1 and the route#2 processing unit 121-2 further includes a loopback controller 1219 interposed between the S/P converter 1211 and the FAS detector 1212.

The output of the S/P converter 1211 corresponding to the ring bus 14a and the output of the ring frame combiner 1217 of the route#2 processing unit 121-2 are input to the loopback controller 1219 of the route#1 processing unit 121-1. In response to a route control signal from the ring route controller 127, the loopback controller 1219 selectively outputs one of these outputs to the FAS detector 1212 of the route#1 processing unit 121-1.

The output of the S/P converter 1211 corresponding to the ring bus 14b and the output of the ring frame combiner 1217 of the route#1 processing unit 121-1 are input to the loopback controller 1219 of the route#2 processing unit 121-2. In response to a route control signal from the ring route controller 127, the loopback controller 1219 selectively outputs one of these outputs to the FAS detector 1212 of the route#2 processing unit 121-2.

For example, in a case where the ring bus 14a toward the next stage (the right side in FIG. 10) is disconnected by the FGPA configuration, the loopback controller 1219 of the route#2 processing unit 121-2 is controlled. That is, the loopback controller 1219 is controlled by the route control signal to select the output of the ring frame combiner 1217 of the route#1 processing unit 121-1. Accordingly, the ring frame received in the route#1 processing unit 121-1 via the ring bus 14a is returned to the ring bus 14b via the route#2 processing unit 121-2.

In contrast, in a case where the ring bus 14b toward the previous stage (the left side in FIG. 10) is disconnected by the FGPA configuration, the loopback controller 1219 of the route#1 processing unit 121-1 is controlled. That is, the loopback controller 1219 is controlled by the route control signal to select the output of the transmission/reception ring frame combiner of the route#2 processing unit 121-2. Accordingly, the ring frame received in the route#2 processing unit 121-2 via the ring bus 14b is returned to the ring bus 14a via the route#1 processing unit 121-1.

In response to a route control signal from the ring route controller 127, the transmission intermediate frame selector 125 selectively outputs one of outputs of the transmission intermediate frame extractors 1214 of the route#1 processing unit 121-1 and the route#2 processing unit 121-2 to the insertion memory 122.

For example, as described above, in a case where the ring frame is returned from the ring bus 14a to the ring bus 14b, the transmission intermediate frame selector 125 selects the transmission intermediate frame extracted by the transmission intermediate frame extractor 1214 of the route#1 processing unit 121-1. That is, the transmission intermediate frame mapped to the ring frame received from the ring bus 14a is selected and stored in the insertion memory 122.

On the contrary, in a case where the ring frame is returned from the ring bus 14b to the ring bus 14a, the transmission intermediate frame selector 125 selects the transmission intermediate frame extracted by the transmission intermediate frame extractor 1214 of the route#2 processing unit 121-2. That is, the transmission intermediate frame mapped to the ring frame received from the ring bus 14b is selected and stored in the insertion memory 122.

In response to a route control signal from the ring route controller 127, the reception intermediate frame selector 126 selectively outputs the reception monitoring control frame stored in the extraction memory 124 to one of the reception intermediate frame inserters 1216 of the processing units 121-1 and 121-2.

For example, in a case where the ring frame is returned from the ring bus 14a to the ring bus 14b, the reception intermediate frame selector 126 selectively outputs the reception monitoring control frame read from the extraction memory 124 to the reception intermediate frame inserter 1216 of the route#2 processing unit 121-2. Accordingly, the reception intermediate frame (reception monitoring control frame) is mapped to the ring frame returned from the route#1 processing unit 121-1 to the route#2 processing unit 121-2.

On the contrary, in a case where the ring frame is returned from the ring bus 14b to the ring bus 14a, the reception intermediate frame selector 126 selectively outputs the reception monitoring control frame read from the extraction memory 124 to the reception intermediate frame inserter 1216 of the route#1 processing unit 121-1. Accordingly, the reception intermediate frame (reception monitoring control frame) is mapped to the ring frame returned from the route#2 processing unit 121-2 to the route#1 processing unit 121-1.

That is, the reception monitoring control frame extracted by the main signal processing chip 12 is transmitted to one of the bidirectional ring buses 14a and 14b according to an instruction from the ring route controller 127, in the ring frame processing unit 121.

The ring route controller 127 provides a route control signal for the loopback controllers 1219 of the processing units 121-1 and 121-2 and the selectors 125 and 126 according to a setting from the CPU 22 of the monitoring controller 20. Accordingly, the above-mentioned returning of the ring frame or the above-mentioned route selection of the transmission/reception intermediate frames is controlled.

In addition, upon receiving a ring disconnection setting from the CPU 22 for execution of FPGA configuration, the ring route controller 127 notifies ring disconnection information to the ring frame route determining unit 217 (see FIG. 9) of the control chip 21.

As illustrated in FIG. 9, the ring route controller 127 corresponding to each port #i is connected to the ring frame route determining unit 217 of the control chip 21 and the presence or absence of the notification of the ring disconnection information is collected in the ring frame route determining unit 217.

Based on the collected ring disconnection information, the ring frame route determining unit 217 determines a route from which transmission/reception of the ring frame in the unit of port #i is possible. For example, it is assumed that the ring disconnection information is detected from the ring route controller 127 corresponding to the port #3. Then, for the ports #1 and #2, it is determined that a route directing from the port #1 to the port #2 (the ring bus 14a) is selected. For the ports #4 to #n, it is determined that a route directing from the port #n to the port #(n−1) (the ring bus 14b) is selected. A result of this determination is notified, as a route selection signal, to the transmission frame route selector 218 and the reception frame route selector 219 of the control chip 21.

In response to the route selection signal, the transmission frame route selector 218 selects a route (the ring bus 14a or 14b) for mapping the transmission intermediate frame into the ring frame in the unit of port #i.

The ring frame generator 213 transmits the ring frame to the bidirectional ring buses 14a and 14b. However, the transmission intermediate frame is only mapped to the ring frame carried over a one-way route selected by the transmission frame route selector 218.

The ring frame termination unit 214 detects the FAS of the ring frame received via the bidirectional ring buses 14a and 14b and extracts a monitoring control frame mapped to the ring frame in any of the main signal processing chips 12. The extracted monitoring control frame is output to the reception frame route selector 219.

In response to the route selection signal from the ring frame route determining unit 217, the reception frame route selector 219 selects the monitoring control signal in the unit of port #i and transmits the monitoring control signal to the reception frame processing unit 215.

The above-described ring frame route determining unit 217 and route selectors 218 and 219 serve as an exemplary selection controller for controlling selection of a route (serial bus 14a or 14b) transmitting/receiving the monitoring control frame in the unit of port, based on disconnection information of any port #i.

Figure 11:
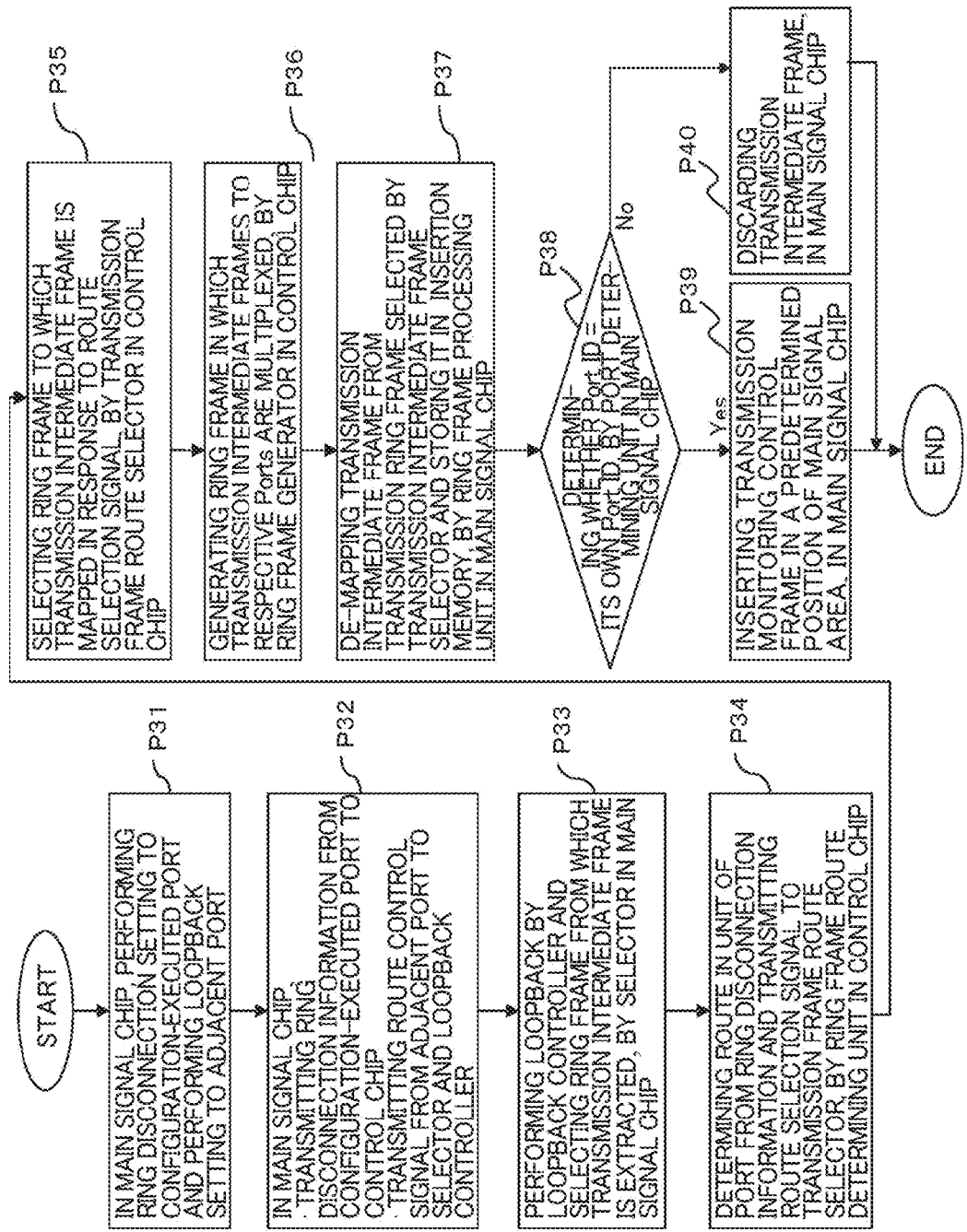
FIG. 11 is a flow chart for explaining an example of monitoring control frame transmission operation according to the second embodiment.
Figure 12:
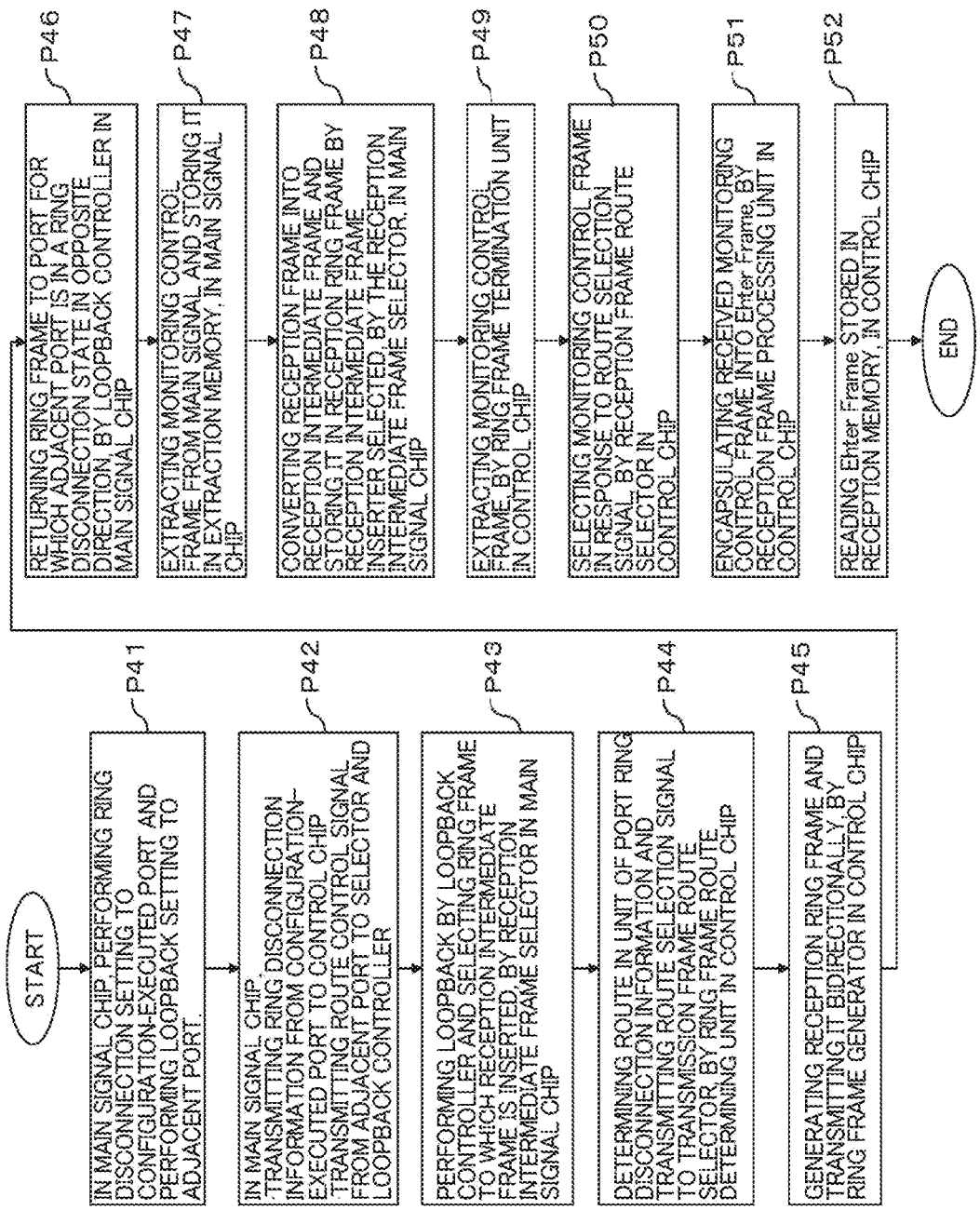
FIG. 12 is a flow chart for explaining an example of monitoring control frame reception operation according to the second embodiment.

Hereinafter, an example of operation of the interface board 1 of the second embodiment as configured above will be described with reference to FIGS. 11 and 12. FIG. 11 is a flow chart illustrating one example of monitoring control frame transmission operation and FIG. 12 is a flow chart illustrating one example of monitoring control frame reception operation.

Transmission Operation Example of Monitoring Control Frame

As illustrated in FIG. 11, first, for the ring route controller 127 corresponding to a port #i (for example, the port #3) where FPGA configuration is executed, a ring disconnection setting is made from the CPU 22 via a control bus (not illustrated). For the ring route controller 127 corresponding to adjacent ports #(i−1) and #(i+1) (for example, the ports #2 and #4), a loopback setting is made from the CPU 22 via the control bus (Operation P31).

In response to this, ring disconnection information is transmitted from the ring route controller 127 corresponding to the port #3 where the configuration is executed to the ring frame route determining unit 217 of the control chip 21. In addition, a route control signal is transmitted from the ring route controller 127 corresponding to an adjacent port #2 to the loopback controller 1219 of the route#2 processing unit 121-2 and the selectors 125 and 136. A route control signal is transmitted from the ring route controller 127 corresponding to an adjacent port #4 to the loopback controller 1219 of the route#1 processing unit 121-1 and the selectors 125 and 126 (Operation P32).

The loopback controller 1219 which received the route control signal performs a returning of the received ring frame and the selectors 125 and 126 which received the route control signal perform route selection of the ring frame in which the reception monitoring control frame is inserted and the ring frame from which the transmission intermediate frame is extracted (Operation P33).

In the meantime, the ring frame route determining unit 217 of the control chip 21 determines a route in the unit of port based on the ring disconnection information from the ring route controller 127 corresponding to each port #1 to #n and transmits the route selection signal to the transmission frame route selector 218 (Operation P34).

In response to the route selection signal received from the ring frame route determining unit 217, the transmission frame route selector 218 selects a ring frame to which the transmission intermediate frame is mapped (Operation P35).

The ring frame generator 213 generates a ring frame in which the transmission intermediate frames to respective ports #1 to #n are multiplexed (Operation P36) and transmits the generated ring frame to each route (the ring buses 14a and 14b). Here, for example, the transmission intermediate frames to the ports #1 and #2 are mapped to the ring frame to be transmitted to the ring bus 14a and the transmission intermediate frame to the ports #4 to #n is mapped to the ring frame transmitted to the ring bus 14b.

In response to the route control signal from the ring route controller 127, the ring frame processing unit 121 of the main signal processing chip 12 de-maps the transmission intermediate frame from the ring frame selected by the transmission intermediate frame selector 125 and stores the transmission intermediate frame in the insertion memory 122 (Operation P37).

For example, in the ring frame processing unit 121 corresponding to the ports #1 and #2, the transmission intermediate frame mapped to the ring frame received from the ring bus 14a is selected by the transmission intermediate frame selector 125.

On the other hand, in the ring frame processing unit 121 corresponding to the ports #4 to #n, the transmission intermediate frame mapped to the ring frame received from the ring bus 14b is selected by the transmission intermediate frame selector 125.

In addition, since the control chip 21 (the transmission frame route selector 218) performs the route selection, the transmission intermediate frame cannot be simultaneously received in both directions. Therefore, the insertion memory 122 may have the same capacity as that in the first embodiment.

Next, in the main signal processing chip 12, the port determining unit 123 determines whether the port identifier assigned with the transmission intermediate frame stored in the insertion memory 122 matches its own port identifier (Operation P38).

When it is determined that the port identifier matches its own port identifier ("YES" at Operation P38), the port determining unit 123 issues the instruction to insert the transmission intermediate frame into the insertion memory 122. Thus, the transmission intermediate frame including the monitoring control frame is inserted in a predetermined position of the main signal area and transmitted to the optical module 11 at the port #j (j=1, 2, 4 to n) (Operation P39).

Otherwise, when it is determined that the port identifier does not match its own port identifier ("NO" at Operation P38), the transmission intermediate frame is discarded (overwritten) without issuing the instruction to insert the transmission intermediate frame into the insertion memory 122 from the port determining unit 123 (Operation P40).

Reception Operation Example of Monitoring Control Frame

As illustrated in FIG. 12, first, for the ring route controller 127 corresponding to a port #i (for example, the port #3) where the FPGA configuration is executed, a ring disconnection setting is made from the CPU 22 via a control bus (not illustrated). For the ring route controller 127 corresponding to adjacent ports #(i−1) and #(i+1) (for example, the ports #2 and #4), a loopback setting is made from the CPU 22 via the control bus (Operation P41).

In response to this, ring disconnection information is transmitted from the ring route controller 127 corresponding to the port #3 where the configuration is executed to the ring frame route determining unit 217 of the control chip 21. In addition, a route control signal is transmitted from the ring route controller 127 corresponding to an adjacent port #2 to the loopback controller 1219 of the route#2 processing unit 121-2 and the selectors 125 and 136. A route control signal is transmitted from the ring route controller 127 corresponding to an adjacent port #4 to the loopback controller 1219 of the route#1 processing unit 121-1 and the selectors 125 and 136 (Operation P42).

The loopback controller 1219 which received the route control signal performs returning of the received ring frame and the reception intermediate frame selector 126 which received the route control signal performs route selection of the ring frame in which the reception monitoring control frame is to be inserted (Operation P43).

For example, for the ports #1 and #2, a ring frame returned from the ring bus 14a to the ring bus 14b is selected as a ring frame in which the reception monitoring control frame is to be inserted. For the ports #4 to #n, a ring frame returned from the ring bus 14b to the ring bus 14a is selected as a ring frame in which the reception monitoring control frame is to be inserted.

In the meantime, the ring frame route determining unit 217 of the control chip 21 determines a route in the unit of port based on the ring disconnection information from the ring route controller 127 corresponding to each port #1 to #n and transmits the route selection signal to the transmission frame route selector 218 (Operation P44).

In response to the route selection signal received from the ring frame route determining unit 217, the transmission frame route selector 218 selects a ring frame into which the transmission intermediate frame is mapped. The ring frame generator 213 generates a ring frame including a reception frame storage area (see FIG. 4) and transmits the generated ring frame to both of the ring buses 14a and 14b (Operation P45).

In the ring frame processing unit 121 corresponding to the ports #2 and #4 for which the adjacent port #3 is in a ring disconnection state, a returning of the received ring frame is performed by the loopback controller 1219 (Operation P46).

In the state where the ring frame is returned as described above, the monitoring control frame is extracted from the main signal received via a port #j and is stored in the extraction memory 124 corresponding to the port #j in the main signal processing chip 12 (Operation P47).

The monitoring control frame stored in the extraction memory 124 is output to the reception intermediate frame inserter 1216 of a route selected by the reception intermediate frame selector 126. The reception intermediate frame inserter 1216 converts the received monitoring control frame into a reception intermediate frame and inserts the reception intermediate frame into the ring frame received in one direction (Operation P48).

The ring frame into which the reception intermediate frame is inserted is received in the ring frame termination unit 214 of the control chip 21, and the ring frame termination unit 214 detects the FAS of the ring frame and extracts the reception intermediate frame (monitoring control frame) mapped to the ring frame. The extracted monitoring control frame is output to the reception frame route selector 219 (Operation P49).

In response to a route selection signal from the ring frame route determining unit 217, the reception frame route selector 219 selects a monitoring control frame in the unit of port #i and transmits the selected monitoring control frame to the reception frame processing unit 215 (Operation P50).

The reception frame processing unit 215 encapsulates the received monitoring control frame into an Ethernet frame (Operation P51) and temporarily stores the encapsulated Ethernet frame in the reception memory 216. The Ethernet frame stored in the reception memory 216 is read by the CPU 22 (Operation P52).

As described above, bidirectional ring buses are provided and a port for which a monitoring control frame is transmitted/received in the unit of port based on ring disconnection information is selected and thus, even while a certain port #1 is in configuration change, it is possible to continue transmission of the monitoring control frame to other ports, which can result in functionality of high reliability.

Although the FPGA configuration in the unit of port has been illustrated as an aspect of disconnection of the ring buses 14a and 14b in the above examples, it is possible to reliably transmit the monitoring control frame to other ports even when the event of failure in the unit of port, as in the above examples.

In addition, although the processing of both of insertion and extraction of the monitoring control frame with respect to the main signal frame has been illustrated in the above examples, the processing of one of insertion and extraction is sufficient as long as the above-described operation example can be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transport apparatus configured to transport a main signal received via one of a plurality of ports to any of the plurality of ports, the transport apparatus comprising:
   a plurality of main signal processing circuits configured to extract a monitoring control signal from the main signal, the plurality of main signal processing circuits being provided to correspond to the plurality of ports, respectively;
   a monitoring controller configured to receive the monitoring control signal from the plurality of main signal processing circuits;
   a serial interface configured to connect the plurality of main signal processing circuits with the monitoring controller on a ring-shaped bus to transfer a serial frame, wherein the serial frame has a mapping field to which the monitoring control signal is mapped; wherein the mapping field includes a transmission mapping field and a reception mapping field, wherein each of the plurality of main signal processing circuits includes a frame processing unit configured to map a reception monitoring control signal extracted from the main signal to the reception mapping field so as to transmit the reception monitoring control signal to the monitoring controller, and wherein the monitoring controller includes a serial frame transmitter configured to generate the serial frame in which a transmission monitoring control signal to be inserted in the main signal is mapped to the transmission mapping field so as to transmit the serial frame to the serial interface.

2. The transport apparatus according to claim 1, wherein the serial frame is a multi-frame having a multi-frame number for identifying the plurality of ports, and wherein the frame processing unit is configured to map the reception monitoring control signal to the reception mapping field corresponding to the multi-frame number.

3. The transport apparatus according to claim 2,
   wherein the frame processing unit is configured to map, to the reception mapping field, a reception intermediate frame generated by assigning, to the reception monitoring control signal, a port identifier for identifying a port in which the reception monitoring control signal is received and information for identifying a length of the reception monitoring control signal.

4. The transport apparatus according to claim 1, wherein the serial frame transmitter includes: a transmission intermediate frame generator configured to generate a transmission intermediate frame generated by assigning a port identifier for identifying each of the plurality of ports and information for identifying a length of the transmission monitoring control signal to the transmission monitoring control signal; and a serial frame generator configured to generate the serial frame generated by mapping the transmission intermediate frame to the transmission mapping field, and wherein each of the main signal processing circuit includes a port determining unit configured to determine whether the transmission intermediate frame received from the serial interface is a transmission intermediate frame transmitted to a port corresponding to the main signal processing circuit, based on the port identifier, and wherein when it is determined by the port determining unit that the transmission intermediate frame received from the serial interface is a transmission intermediate frame to a port corresponding to the main signal processing circuit, the transmission monitoring control signal of the length identified by the length identifying information included in the transmission intermediate frame is inserted in the main signal.

5. The transport apparatus according to claim 1,
   wherein the serial interface includes first and second serial buses for transmitting the serial frame in the opposite directions, and
   wherein the monitoring controller is configured to control connection of the serial buses in the frame processing unit such that the serial frame is returned to be transmitted from one of the first and second serial buses to the other of the first and second serial buses in the frame processing unit corresponding to a port adjacent to a port which is in a disconnection state.

6. The transport apparatus according to claim 5,
   wherein each of the main signal processing circuits includes a port disconnection information notifying unit configured to notify the monitoring controller of port disconnection information indicating whether the corresponding port is in a disconnection state, and
   wherein the monitoring controller includes a selection controller configured to control selection of the first and second serial buses transmitting/receiving the monitoring control signal in the unit of port based on the port disconnection information.

7. The transport apparatus according to claim 6,
   wherein the selection controller configured to perform controls such that a transmission monitoring control signal to be inserted in the main signal is transmitted to the selected one of the first and second serial buses and is not transmitted to the other of the first and second serial buses.

8. The transport apparatus according to claim 6,
   wherein each of the main signal processing circuits configured to map a reception monitoring control signal extracted from the main signal to the mapping field of both the first and second serial buses, and
   wherein the selection controller selects one of the first and second serial buses, which receives the reception monitoring control signal in the unit of port.

9. A method of transmitting monitoring control signal in a transport apparatus configured to transport a main signal received via one of a plurality of ports to any of the plurality of ports, the method comprising: connecting a plurality of main signal processing circuits which are provided to correspond to the plurality of ports and configured to extract a monitoring control signal from the main signal with a monitoring controller which receives the monitoring control signal from the plurality of main signal processing circuits on a ring-shaped bus by means of a serial interface;

transmitting a serial frame having a mapping field to which the monitoring control signal is mapped to the serial interface; wherein the mapping field includes a transmission mapping field and a reception mapping field, wherein each of the plurality of main signal processing circuits includes a frame processing unit configured to map a reception monitoring control signal extracted from the main signal to the reception mapping field so as to transmit the reception monitoring control signal to the monitoring controller, and wherein the monitoring controller includes a serial frame transmitter configured to generate the serial frame in which a transmission monitoring control signal to be inserted in the main signal is mapped to the transmission mapping field so as to transmit the serial frame to the serial interface.

* * * * *